United States Patent
Lee

(10) Patent No.: US 7,742,656 B2
(45) Date of Patent: Jun. 22, 2010

(54) OBSERVATION SYSTEM TO DISPLAY MASK AREA CAPABLE OF MASKING PRIVACY ZONE AND METHOD TO DISPLAY MASK AREA

(75) Inventor: Hyeok-beom Lee, Suwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 1176 days.

(21) Appl. No.: 11/346,238

(22) Filed: Feb. 3, 2006

(65) Prior Publication Data

US 2006/0192853 A1 Aug. 31, 2006

(30) Foreign Application Priority Data

Feb. 26, 2005 (KR) .................. 10-2005-0016280

(51) Int. Cl.
*G06K 9/20* (2006.01)

(52) U.S. Cl. ............................ 382/283; 348/143
(58) Field of Classification Search .................. None
See application file for complete search history.

(56) References Cited

U.S. PATENT DOCUMENTS

| | | | | |
|---|---|---|---|---|
| 5,801,770 A * | 9/1998 | Paff et al. | ............. | 348/211.5 |
| 6,215,519 B1 * | 4/2001 | Nayar et al. | ............. | 348/159 |
| 6,509,926 B1 * | 1/2003 | Mills et al. | ............. | 348/143 |
| 6,727,938 B1 * | 4/2004 | Randall | ............. | 348/143 |
| 6,744,461 B1 * | 6/2004 | Wada et al. | ............. | 348/143 |
| 7,161,615 B2 * | 1/2007 | Pretzer et al. | ............. | 348/143 |
| 7,218,342 B2 * | 5/2007 | Kobayashi et al. | ....... | 348/211.8 |
| 7,385,626 B2 * | 6/2008 | Aggarwal et al. | ........... | 348/143 |
| 7,423,667 B2 * | 9/2008 | Hayasaka | ............. | 348/143 |
| 2003/0137589 A1 * | 7/2003 | Miyata | ............. | 348/211.7 |
| 2003/0227555 A1 * | 12/2003 | Kobayashi et al. | ....... | 348/231.6 |
| 2004/0119819 A1 * | 6/2004 | Aggarwal et al. | ........... | 348/143 |

FOREIGN PATENT DOCUMENTS

| | | |
|---|---|---|
| JP | 06-181539 | 6/1994 |
| JP | 2000-278584 | 10/2000 |
| JP | 2004-015362 | 1/2004 |
| JP | 2004-146890 | 5/2004 |
| KR | 1020000056643 | 9/2000 |
| KR | 1020050011034 | 1/2005 |

* cited by examiner

*Primary Examiner*—Samir A. Ahmed
*Assistant Examiner*—Jayesh Patel
(74) *Attorney, Agent, or Firm*—Sughrue Mion, PLLC

(57) ABSTRACT

An observation system for masking a privacy zone and method thereof are provided. The observation system has a camera part that photographs a certain observation area. An operation part receives a user-set command for selecting a privacy zone among the observation area, where the privacy zone requires no observation. A control part outputs a control signal for setting a mask area that masks the privacy zone according to the user-set command. An area set part generates a plurality of vertexes forming the mask area according to the control signal. An image signal process part uses a mosaic scheme to masks the privacy zone photographed by the camera part according to the mask area formed by the plurality of vertexes set by the area set part. An output part displays the mask area masked by the image signal process part. Therefore, the privacy zone photographed from the camera part is not displayed on a screen.

10 Claims, 10 Drawing Sheets

OBSERVATION SYSTEM TO DISPLAY MASK AREA CAPABLE OF MASKING PRIVACY ZONE AND METHOD TO DISPLAY MASK AREA

CROSS-REFERENCE TO RELATED APPLICATIONS

This application claims the benefit under 35 U.S.C. §119 (a) of Korean Patent Application No. 2005-16280 filed on Feb. 26, 2005, the entire contents of which are hereby incorporated by reference.

BACKGROUND OF THE INVENTION

1. Field of the Invention

The present invention relates to an observation system to display a mask area capable of masking a privacy zone and a method to display the mask area. More particularly, the present invention relates to an observation system that calculates a mask area included in an observation area photographed by an observation camera to mask a privacy zone, and a method thereof.

2. Description of the Related Art

Recently, observation cameras have been installed in buildings or on streets to prevent crime and theft. Images photographed by the observation cameras are displayed on monitors of police stations or building management offices to notify policemen or managers of the present status of the locations at which the observation cameras are installed. As described above, an observation system displays on a certain monitor an image photographed by an observation camera. The observation system includes a controller for controlling operation of the observation camera such that a user may control operation of the observation camera and the monitor.

FIG. 1 is a view of a conventional observation system.

Referring to FIG. 1, the conventional observation system includes an observation camera 10, a monitor 20, and a controller 30.

The observation camera 10 includes a charge coupled device (CCD) for photographing a certain observation area and a driving part (not shown) for driving the lens part 15 to rotate in a horizontal direction by a pan angle of 360°, to rotate in a vertical direction by a tilt angle of 180°, and to zoom.

The monitor 20 converts an image signal corresponding to the observation area photographed by the observation camera 10 into an image signal corresponding to the display scheme of the monitor 20 to display on a camera screen 25.

The controller 30 receives a user's adjustment command for adjusting the observation camera 10 and a user-set command for setting operation of the monitor 20 via various operation keys 31 and a joystick 35. The controller 30 outputs a control signal for controlling the observation camera 10 and the monitor 20 according to the received various commands.

The observation system has advantages in preventing crime and theft, however, it also has disadvantages in that privacy is disturbed, because the observation camera covers all the designated areas, including even a privacy area relating to an individual person. To solve this problem, a function is introduced to the observation system that masks the privacy area among the observation area displayed on the camera screen 25.

FIGS. 2A and 2B are views for explaining a method of displaying a mask area according to a conventional observation system.

Referring to FIG. 2A, a user controls the operation of the observation camera 10 via the controller 30 to locate the privacy zone PZ included in the observation area. When the privacy zone PZ is displayed on the camera screen 25, a user sets a mask area M to mask the privacy zone PZ via the controller 30.

Referring to FIG. 2B, a user operates the controller 30 to place the privacy zone PZ on a center of the camera screen 25 and adjusts a size of the mask area M accordingly. The center point (Pi, Ti) of the mask area M is placed on the center of the camera screen 25, and a user operates the certain operation key 31 and the joystick 35 to adjust the size of the mask area M and to set the mask area M. Position data corresponding to the center point (Pi, Ti) of the mask area M and position data corresponding to four vertexes forming the mask area M are stored.

Then, as a user operates the observation camera 10 via the controller 30, the privacy zone PZ displayed on the camera screen 25 is masked via the preset mask area M according to the operation of the observation camera 10. Therefore, it prevents disturbance of the privacy of the privacy zone PZ.

However, according to the conventional method for setting the mask area M, one cannot minutely set the mask area M because the zoom value is fixed and the proportion of the mask area M is fixed to a 4:3 aspect ratio. Additionally, the number of the mask areas M that can be set on a single camera screen 25 is limited to four or less due to limited storage space. Finally, due to the slow speed of calculating the mask area M, the mask area M cannot be displayed on the camera screen 25 as the observation camera 10 pans and tilts by more than a set speed.

Accordingly, a need exists for an improved mask area for and a method of masking a privacy zone captured by an observation system.

SUMMARY OF THE INVENTION

An object of the present invention is to provide an observation system that reduces the calculation requirements for calculating a mask area for masking a privacy zone to set a larger mask area on a camera screen and that displays the mask area on the camera screen even though an operation speed of an observation camera exceeds a certain degree, and a method thereof.

Another object of the present invention is to provide an observation system that minutely sets the mask area according to sizes and shapes of the privacy zones to mask the privacy zone, and a method thereof.

An observation system includes a camera part photographing a certain observation area. An operation part receives a user-set command for selecting a privacy zone among the observation area in which the privacy zone does not require observation. A control part outputs a control signal for setting a mask area that masks the privacy zone according to the user-set command. An area set part generates a plurality of vertexes that form the mask area according to the control signal. An image signal process part uses a mosaic scheme to mask the privacy zone photographed by the camera part according to the mask area formed by the plurality of vertexes set by the area set part. An output part displays the mask area masked by the image signal process part.

The area set part may included an area storage part that stores position data corresponding to the plurality of vertexes. The position data includes a rotating angle of the camera part in a horizontal direction, a rotating angle of the camera part in a vertical direction, and a zoom value of the camera part, each of which corresponds to the plurality of vertexes. A calculation part calculates the mask area corresponding to a position and a size of the privacy zone when the privacy zone is photographed by the camera part.

The calculation part may model the rotating angle of the camera part in a horizontal direction, the rotating angle of the camera part in a vertical direction, and the zoom value of the camera part into the position data corresponding to the plurality of vertexes on a hemispheric three-dimensional coordinate system.

The calculation part may convert the rotating angle of the camera part in a horizontal direction, the rotating angle of the camera part in a vertical direction, and the zoom value corresponding to the plurality of vertexes modeled on the hemispheric three-dimensional coordinate system into the position data with x and y coordinates on a two-dimensional coordinate system by using the following equations:

x coordinate of each vertex=$R*Z*\cos(T)*\sin(P-Pc)$ y coordinate of each vertex=$R*Z*\cos(Tc)-R*Z*\cos(T)*\cos(P-Pc)$ in which R is a radius of a circle modeled on the two-dimensional coordinate system when the hemispheric three-dimensional coordinate system is projected to the two-dimensional coordinate system, Pc is a rotating angle of the camera part in a horizontal direction corresponding to a center of a camera screen photographed from the camera part, and Tc is a rotating angle of the camera part in a vertical direction, corresponding to the center of the camera screen photographed from the camera part.

The calculation part may convert the position data corresponding to the plurality of vertexes with x and y coordinates on the two-dimensional coordinate system to the position data on the image coordinate system displayed on the camera screen.

The calculation part may divide the camera screen into blocks of a certain unit of pixels on the image coordinate system and convert the position data on the image coordinate system into the position data that is block-wise divided on the image coordinate system.

The calculation part may calculate the mask area by using a linear equation based on the position data corresponding to the plurality of vertexes on the image coordinate system that is block-wise divided.

The area set part may further include a buffer part temporarily storing an image signal corresponding to the mask area calculated by the calculation part.

A method of displaying a mask area of an observation system is provided that includes a camera part that photographs a certain observation area. The certain observation area is photographed. A user-set command is input that selects a privacy zone among the observation area. The privacy zone does not require observation. A control signal is output that sets the mask area for masking the privacy zone according to the user-set command. A plurality of vertexes are generated that form the mask area according to the control signal. The privacy zone photographed from the camera part is masked according to a mosaic scheme based on the mask area formed by the plurality of vertexes. The mask area is displayed.

The step of generating the plurality of vertexes may include storing a position data corresponding to the plurality of vertexes. The position data includes a rotating angle of the camera part in a horizontal direction, a rotating angle of the camera part in a vertical direction, and a zoom value of the camera part, each of which corresponds to the plurality of vertexes. A mask area is calculated corresponding to a position and a size of the privacy zone when the privacy zone is photographed by the camera part.

The step of calculating the mask area may model the rotating angle of the camera part in a horizontal direction, the rotating angle of the camera part in a vertical direction and the zoom value of the camera part into position data corresponding to the plurality of vertexes on a hemispheric three-dimensional coordinate system.

The step of calculating the mask area may convert the rotating angle of the camera part in a horizontal direction, the rotating angle of the camera part in a vertical direction and the zoom value corresponding to the plurality of vertexes modeled on the hemispheric three-dimensional coordinate system into position data with x and y coordinates on a two-dimensional coordinate system by using the following equation:

x coordinate of each vertex=$R*Z*\cos(T)*\sin(P-Pc)$ y coordinate of each vertex=$R*Z*\cos(Tc)-R*Z*\cos(T)*\cos(P-Pc)$ in which R is a radius of a circle modeled on the two-dimensional coordinate system when the hemispheric three-dimensional coordinate system is projected to the two-dimensional coordinate system, Pc is a rotating angle of the camera part in a horizontal direction corresponding to a center of a camera screen photographed from the camera part, and Tc is a rotating angle of the camera part in a vertical direction corresponding to the center of the camera screen photographed from the camera part.

The step of calculating the mask area may convert the position data corresponding to the plurality of vertexes with x and y coordinates on the two-dimensional coordinate system into the position data on the image coordinate system displayed on the camera screen.

The step of calculating the mask area may divide the camera screen into blocks of a certain unit of pixels on the image coordinate system and convert the position data on the image coordinate system into the position data that is block-wise divided on the image coordinate system.

The step of calculating the mask area may calculate the mask area by using a linear equation based on the position data corresponding to the plurality of vertexes on the image coordinate system that is block-wise divided.

The step of generating the plurality of vertexes may further include temporarily storing an image signal corresponding to the mask area.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above aspects and features of the present invention will be more apparent by describing certain exemplary embodiments of the present invention with reference to the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention are described in detail with reference to the annexed drawings. In the following description, detailed descriptions of known functions and configurations incorporated herein are omitted for conciseness and clarity.

Figure 1:
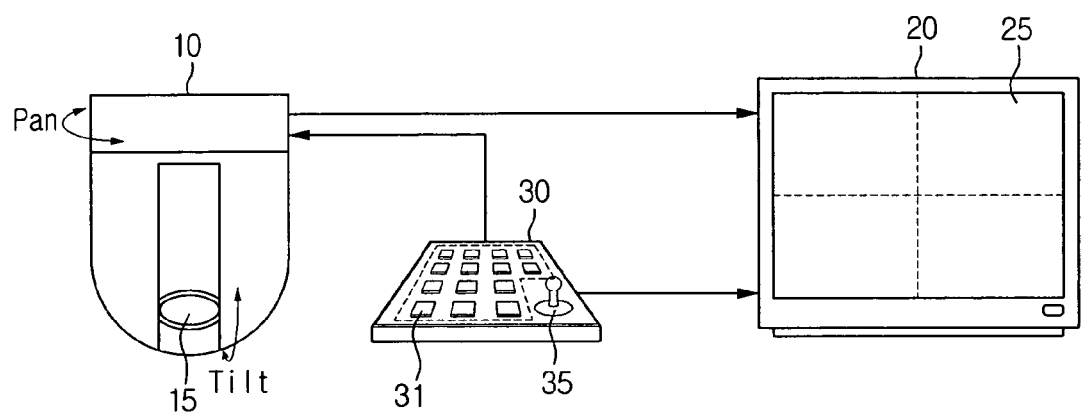
FIG. 1 is a schematic diagram of a conventional observation system.
Figure 2A:
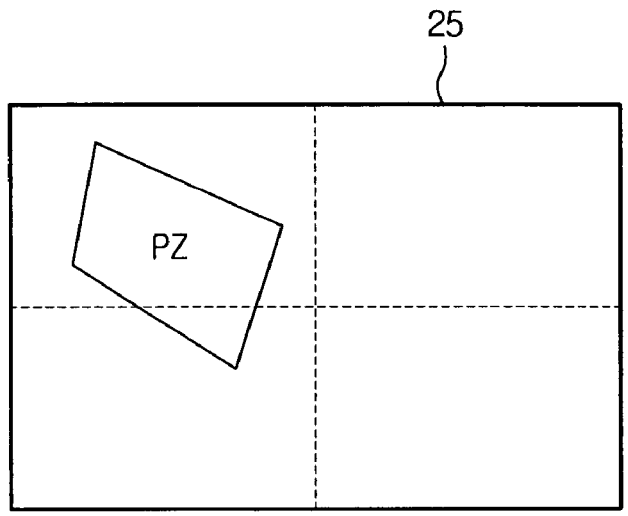
FIGS. 2A and 2B are views illustrating a method of displaying a mask area according to the conventional observation system.
Figure 2B:
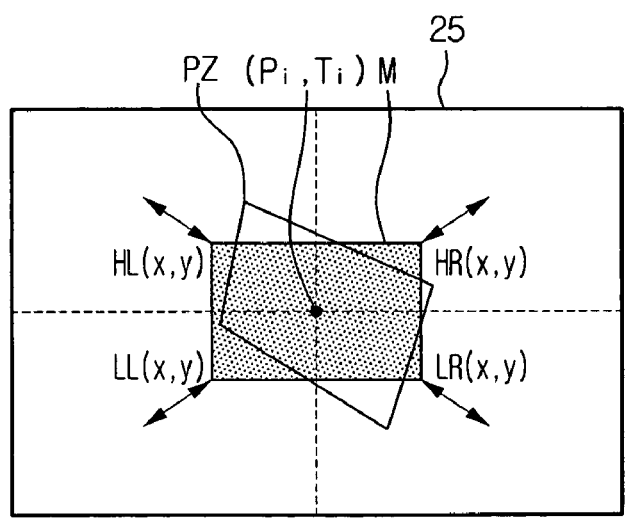
Figure 3:
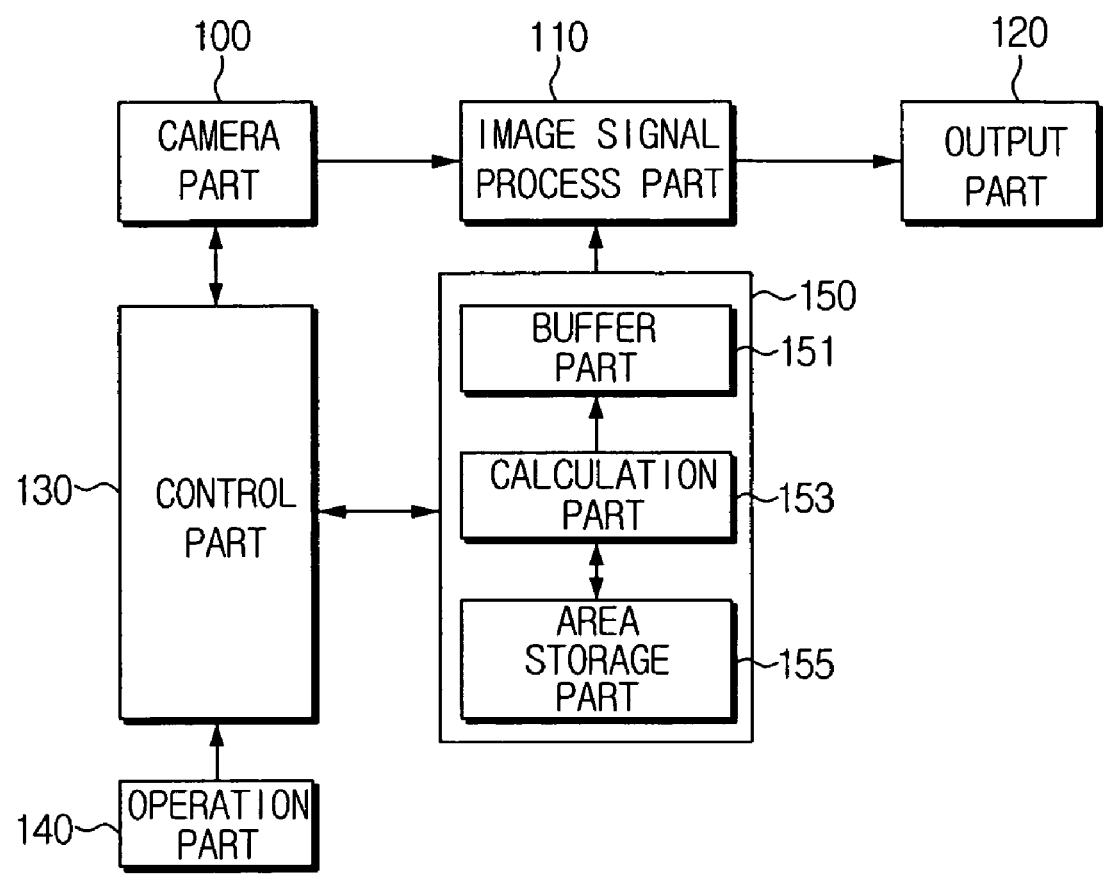
FIG. 3 is a block diagram of an observation system according to an exemplary embodiment of the present invention.

FIG. 3 is a block diagram of an observation system according to an exemplary embodiment of the present invention.

Referring to FIG. 3, the observation system includes a camera part 100, an image signal process part 110, an output part 120, a control part 130, an operation part 140, and an area set part 150.

The camera part 100 includes a charge coupled device (CCD) lens part (not shown) for photographing a certain observation area and a driving part (not shown) for driving the lens part (not shown) to pan a full 360°, tilt 90° or 180°, and zoom according to a driving control signal of the control part 130, which will be explained later.

The image signal process part 110 signal-processes an image signal corresponding to an observation area photographed from the camera part 100 to transmit the signal to the output part 120, which will be explained later. When a privacy zone is photographed according to operations of the camera part 100 and a mask area for masking the privacy zone is calculated from the area set part 150, the image signal process part 110 masks the privacy zone according to a mosaic scheme based on the calculated mask area transmitted to the output part 120.

The output part 120 is a display device, such as a liquid crystal display (LCD) monitor, which outputs the image signal that is signal-processed from the image signal process part 110 onto a screen. A user refers to the image signal corresponding to the observation area output via the output part 120 to control operations of the camera part 100. The mask area is output to the output part 120 in which the privacy zone photographed according to operations of the camera part 100 is masked according to a mosaic scheme.

The control part 130 outputs an adjustment control signal for controlling the camera part 100 to pan, tilt, and zoom according to an adjustment command that is input via the operation part 140 by a user to be transmitted to the camera part 100. The control part 130 controls the area set part 150 to set a mask area according to the set command input by a user via the operation part 140.

The operation part 140 includes operation keys (not shown) and a joystick (not shown) for receiving various commands for a user to control operations of the observation system. The adjustment command for controlling the camera part 100 and the set command for setting the mask area are input by a user via the operation part 140.

The area set part 150 sets and stores the mask area according to the set command of a user and calculates the mask area corresponding to a position and a size of the privacy zone when the privacy zone is included in the observation area photographed according to operation of the camera part 100. The area set part 150 includes a buffer part 151, a calculation part 153, and an area storage part 155.

Position data corresponding to four vertexes that form the mask area are stored to the area storage part 155. The stored position data is generated when each vertex is located on the center of the camera screen.

The calculation part 153 calculates the mask area for masking the privacy zone PZ included in the observation area photographed from the camera part 100. The calculation part 153 uses the position data corresponding to four vertexes stored at the area storage part 155 according to the set commands of a user to calculate the mask area corresponding to the size and position of the privacy zone photographed from the camera part 100.

The calculation part 153 models the four vertexes forming the mask area on a three dimensional coordinate system as the pan angle P that is a rotating angle in a horizontal direction, the tilt angle T that is a rotating angle in a vertical direction, and the zoom value Z of the camera part 100. Then, the calculation part 153 uses the pan angle P, the tilt angle T, and the zoom value Z to convert the four vertexes into the position data with x and y coordinate values on a two-dimensional coordinate system. The four vertexes with x and y coordinate values on the two-dimensional coordinate system are converted into position data on an image coordinate system displayed on the camera screen, and the camera screen is divided into a certain unit of blocks to calculate the mask area.

The mask area calculated from the calculation part 153 is temporarily stored to the buffer part 151, and the stored mask area is output to the image signal process part 110 to perform signal processing.

Figure 4:
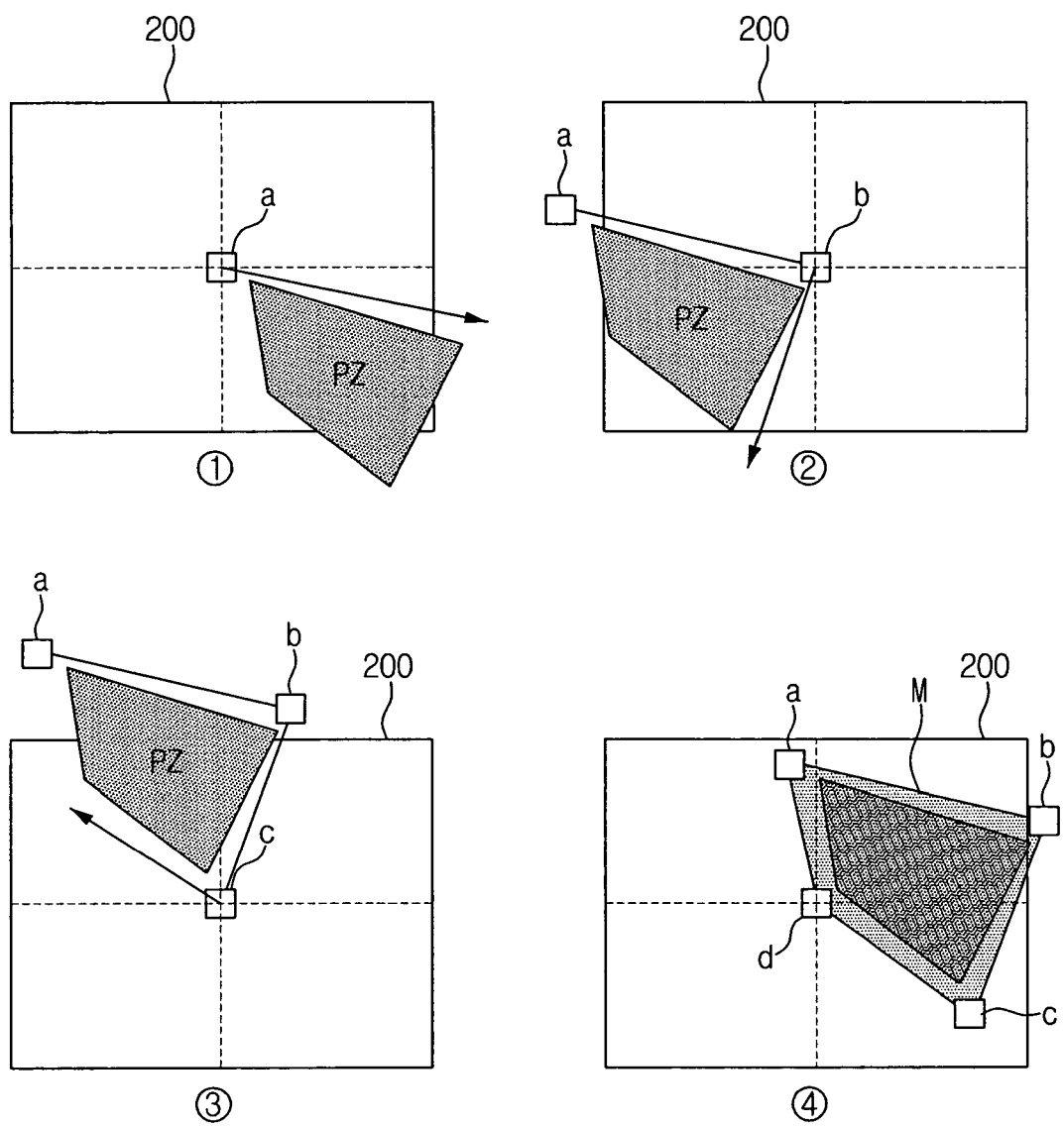
FIG. 4 is a view illustrating a method of setting a mask area of the observation system according to an exemplary embodiment of the present invention.

FIG. 4 is a view illustrating a method of setting a mask area of an observation system according to an exemplary embodiment of the present invention.

Referring to FIG. 4, a user inputs an adjustment command via the operation part 140 to search the privacy zone PZ included in the observation area. In the process ① of FIG. 4, a user inputs the adjustment command via the operation part 140 to locate the center of the camera screen 200 on the first vertex a forming the mask area M for masking the privacy zone PZ. A set command is input to generate the pan angle $P_1$, the tilt angle $T_1$, and the zoom value $Z_1$ corresponding to the first vertex a. The generated pan angle $P_1$, tilt angle $T_1$, and zoom value $Z_1$ corresponding to the first vertex a are stored to the area storage part 155.

In the processes ② and ③ of FIG. 4, a user inputs the adjustment command via the operation part 140 in the same manner of the process ① to locate the center of the camera screen 200 on the second vertex b and the third vertex c that form the mask area M. Then, a user inputs the set command to generate the pan angles $P_2$ and $P_3$, the tilt angles $T_2$ and $T_3$, and the zoom values $Z_2$ and $Z_3$ corresponding to the second vertex b and the third vertex c. The generated pan angles $P_2$ and $P_3$, tilt angles $T_2$ and $T_3$, and zoom values $Z_2$ and $Z_3$ corresponding to the second vertex b and the third vertex c are stored to the area storage part 155.

Likewise, in the process ④, a user generates the pan angle $P_4$, the tilt angle $T_4$, and the zoom value $Z_4$ corresponding to the fourth vertex d, which are stored to the area storage part 155. As the fourth vertex d is generated, the mask area M is displayed on the camera screen 200 which is composed of the first vertex a, the second vertex b, the third vertex c, and the fourth vertex d to mask the privacy zone PZ.

FIGS. 5A to 5E are views illustrating a method of calculating a mask area of an observation system according to an exemplary embodiment of the present invention.

Figure 5A:
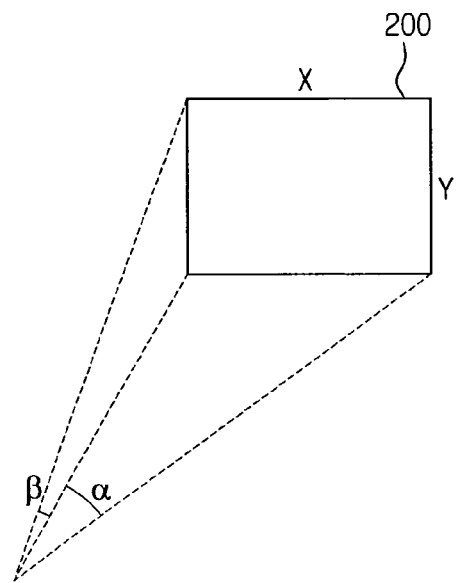
FIGS. 5A through 5E are views illustrating a method of calculating a mask area of the observation system according to an exemplary embodiment of the present invention.

FIG. 5A is a view illustrating a size and an angle of view of the camera screen 200.

On the camera screen 200, the observation area photographed by the camera part 100 is displayed. The horizontal X and vertical Y coordinates of the camera screen 200 are regular irrespective of the pan angle P, the tilt angle T, and the zoom value Z of the camera part 100.

The degrees of the horizontal angle of view α and the vertical angle of view β depend on the zoom value Z. Examples of the degrees of the horizontal angle of view α and the vertical angle of view β depend on the zoom value Z are provided in the following table 1.

TABLE 1

| Zoom value Z | Minimum (Wide) | Maximum (tele) |
|---|---|---|
| horizontal angle of view α | 47.9 | 2.3 |
| vertical angle of view β | 36.9 | 1.7 |

Referring to Table 1, when the zoom value Z is at a minimum, in other words, in a wide condition, the horizontal angle of view α of the camera screen 200 is approximately 48° and the vertical angle of view β is approximately 37°.

Figure 5B:
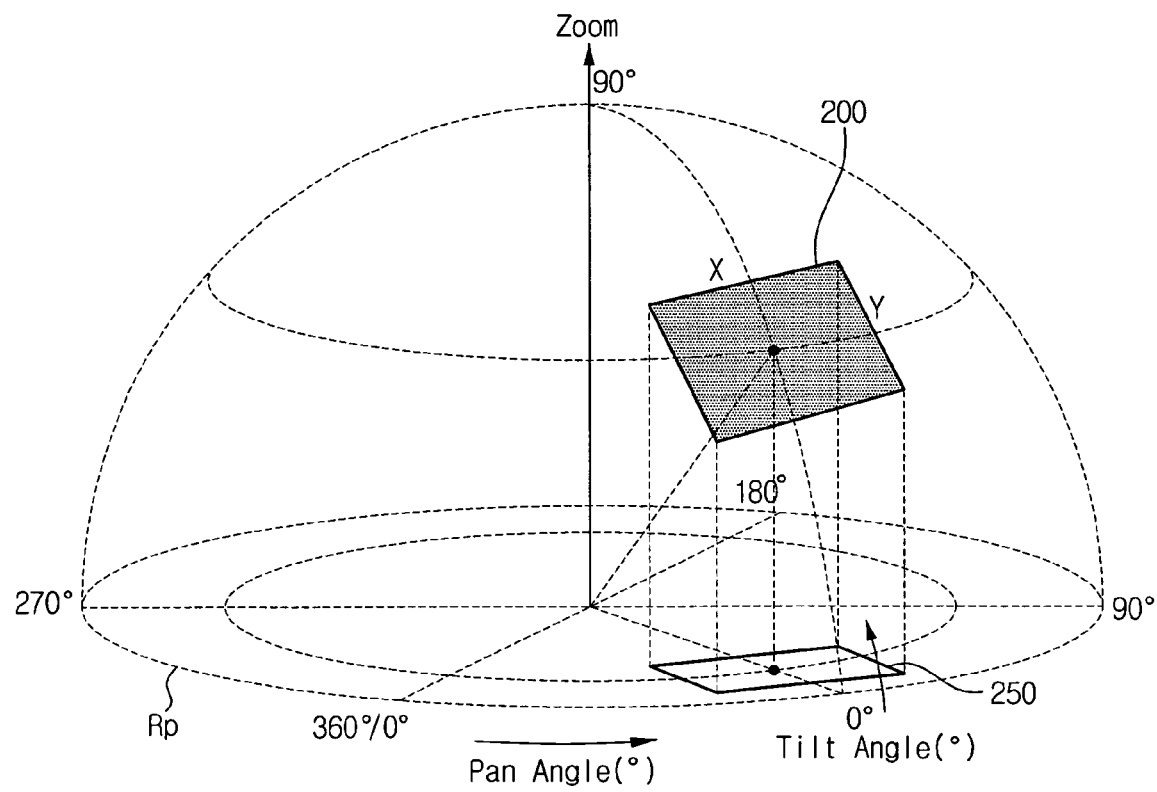

FIG. 5B is a view illustrating a method of converting the camera screen 200 modeled on the three-dimensional coordinate system to a two-dimensional screen 250 on the two-dimensional coordinate system.

The three-dimensional coordinate system is modeled into a hemisphere form as depicted in FIG. 5B when the zoom value Z is at a minimum, in other words, Zoom=1. At this time, when the horizontal angle of view α is 48° and the tilt angle Tc of the center of the camera screen 200 is 0°, the moving range in a horizontal direction of the camera screen 200 may be calculated based on the following equation 1.

moving range in a horizontal direction=(360°/48°)
*X=7.5X [Equation 1]

When the vertical angle of view β is 37°, the moving range in a vertical direction of the camera screen 200 may be calculated based on the following equation 2.

moving range in a vertical direction=(180°/37°)
*Y=4.9X [Equation 2]

The circumference Rp of a bottom circle of the hemispheric three-dimensional coordinate system may be calculated based on the following equation 3.

$2\pi Rp=7.5X \rightarrow Rp=(7.5/2\pi)X$ [Equation 3]

The camera screen 200 on the hemispheric three-dimensional coordinate system with the horizontal moving range and the vertical moving range is projected on the circular two-dimensional coordinate system to convert into the two-dimensional screen 250. The center of the camera screen 200 has coordinate values of the pan angle Pc, the tilt angle Tc, and the zoom value Zc on the three-dimensional coordinate system. Because the center of the two-dimensional screen 250 projected on the two-dimensional coordinate system is displayed on the two-dimensional coordinate system, the center has coordinate values of the pan angle Pc and tilt angle Tc in which the zoom value Zc is not necessary.

Figure 5C:
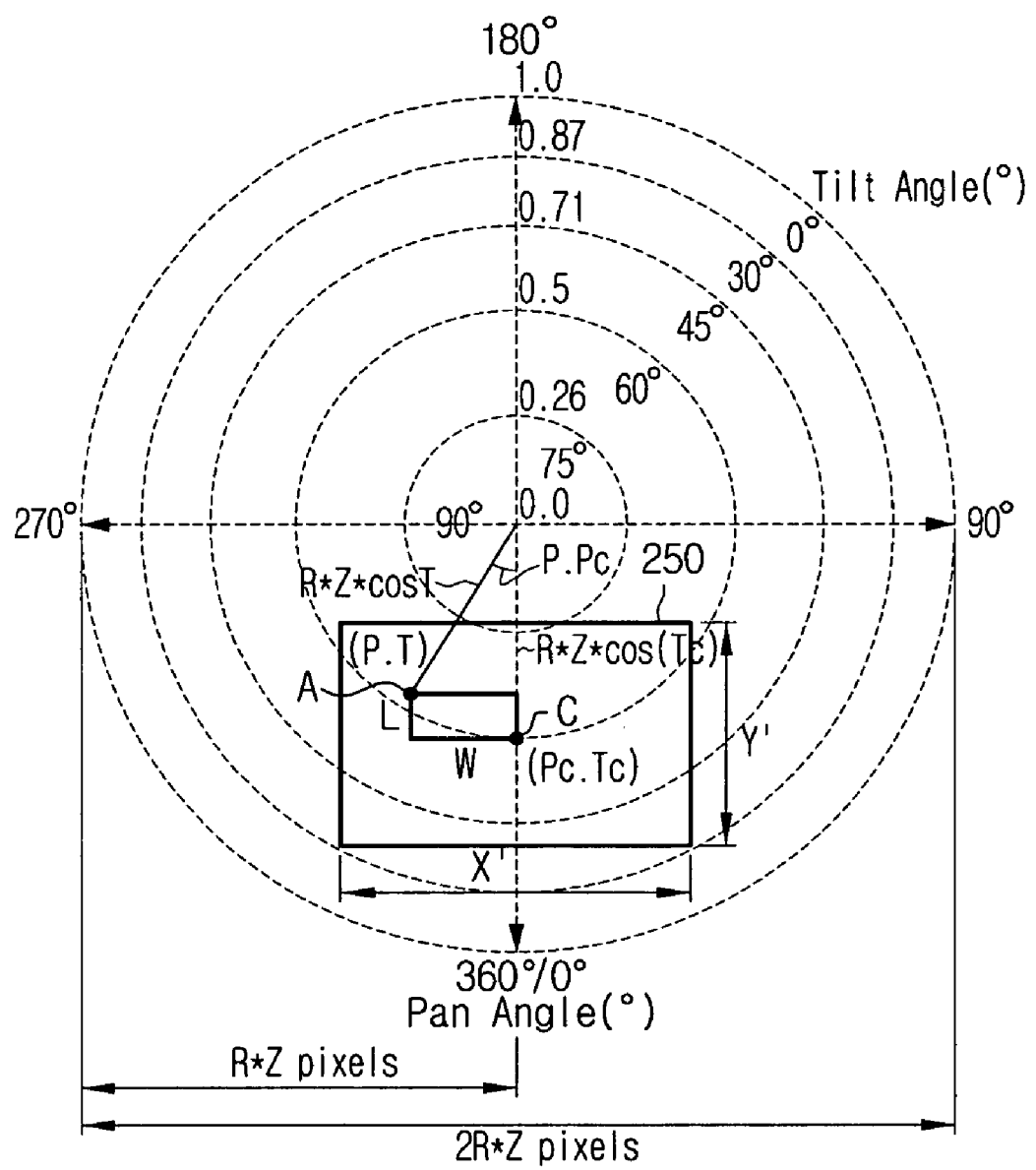

FIG. 5C illustrates a method of calculating a horizontal distance W and a vertical distance L between the center C and any point A on the two-dimensional screen 250.

The length of the horizontal X' of the two-dimensional screen 250 projected on the circular two-dimensional coordinate system is the same as the length of the horizontal X of the camera screen 200 modeled on the three-dimensional coordinate system. However, the length of the vertical Y' of the two-dimensional screen 250 may be shown as Y*sin(Tc) since the length of the vertical Y' of the two-dimensional screen 250 modeled on the circular two-dimensional coordinate system depends on the tilt angle Tc corresponding to the camera screen 200 modeled on the three-dimensional coordinate system.

The radius R of the circle projected on the two-dimensional coordinate system depicted in FIG. 5C may be shown as R pixel which is the number of pixels displayed on the radius of the circular two-dimensional coordinate system if the zoom value is minimum (zoom=1). When the zoom value Z gets larger, the radius R of the circle projected on the two-dimensional coordinate system gets greater, and when the zoom value Z gets smaller, the radius R of the circle projected on the two-dimensional coordinate system gets smaller. Therefore, the radius R of the circular two-dimensional coordinate system may be shown as R*Z pixel according to changes of the zoom value Z. The diameter of the circular two-dimensional coordinate system may be shown as 2*R*Z pixel.

The coordinate of an arbitrary point A is (P, T), the coordinate of the center C of the two-dimensional screen 250 is (Pc, Tc), and the zoom values of each point A and C are the same. The horizontal distance W and the vertical distance L between the center C and the arbitrary point A of the two-dimensional screen 250 are calculated by using the above coordinates based on the following equation 4.

$W=R*Z*\cos(T)*\sin(P-Pc)$ [Equation 4]

$L=R*Z*\cos(Tc)-R*Z*\cos(T)*\cos(P-Pc)$

The horizontal distance W is the x coordinate value of the arbitrary point A modeled on the circular two-dimensional coordinate system, and the vertical distance L is the y coordinate value of the arbitrary point A modeled on the circular two-dimensional coordinate system.

Figure 5D:
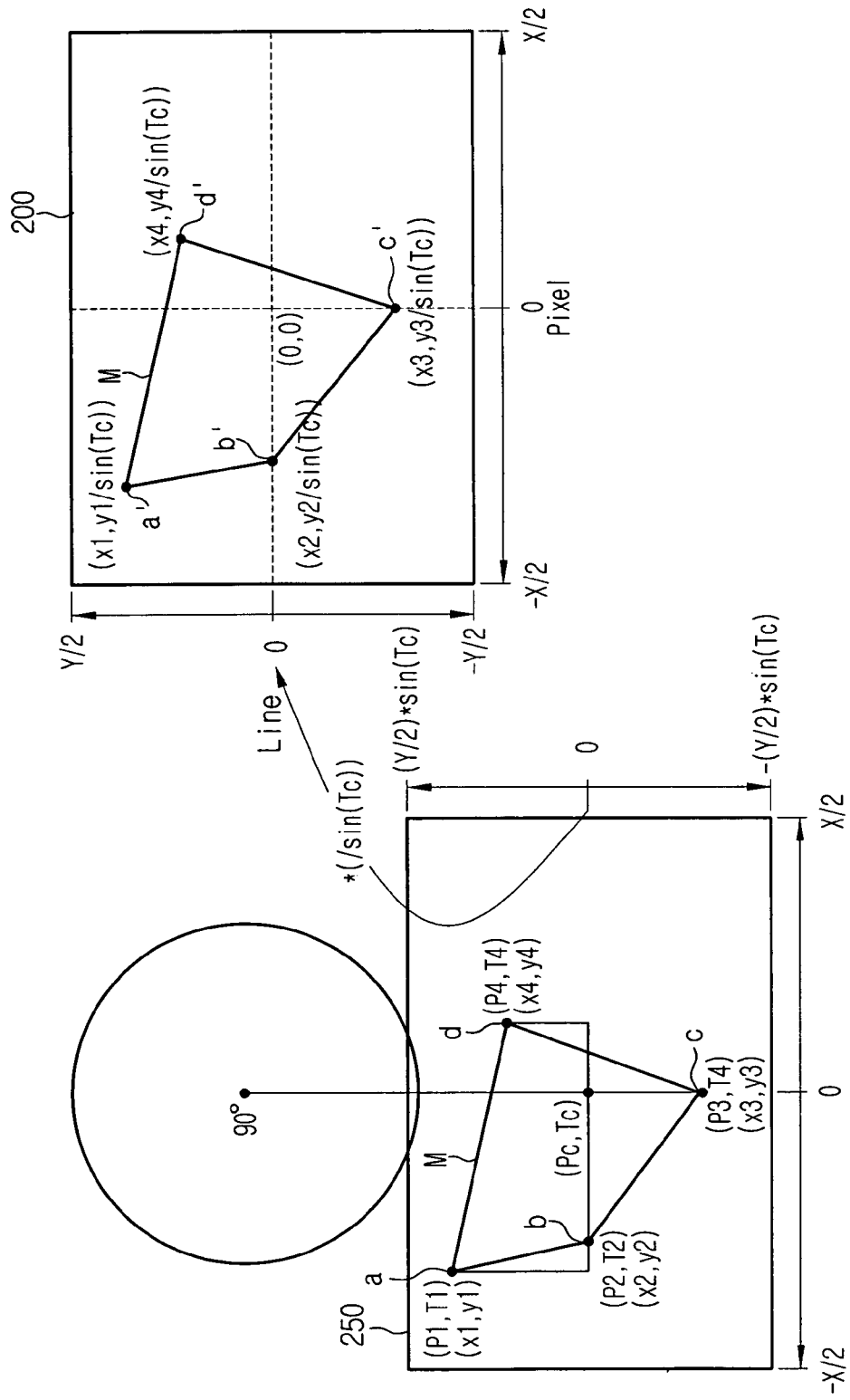

FIG. 5D illustrates a method of converting the mask area M modeled on two-dimensional coordinate system into an image coordinate system.

As described above with reference to FIG. 5C, the horizontal distance W and the vertical distance L between the center C of the two-dimensional screen 250 and each of the first vertex a, the second vertex b, the third vertex c, and the fourth vertex d forming the mask area are calculated. The calculated horizontal distance W and vertical distance L are the x coordinate value and y coordinate value of each vertex a, b, c and d, as shown in Table 2.

TABLE 2

| Vertex | x coordinate | y coordinate |
|---|---|---|
| The 1st vertex | $x1 = R * Z * \cos(T_1) * \sin(P_1 - Pc)$ | $y1 = R * Z * \cos(Tc) - R * Z * \cos(T_1) * \cos(P_1 - Pc)$ |
| The 2nd vertex | $x2 = R * Z * \cos(T_2) * \sin(P_2 - Pc)$ | $y2 = R * Z * \cos(Tc) - R * Z * \cos(T_2) * \cos(P_2 - Pc)$ |
| The 3rd vertex | $x3 = R * Z * \cos(T_3) * \sin(P_3 - Pc)$ | $y3 = R * Z * \cos(Tc) - R * Z * \cos(T_3) * \cos(P_3 - Pc)$ |
| The 4th vertex | $x4 = R * Z * \cos(T_4) * \sin(P_4 - Pc)$ | $y4 = R * Z * \cos(Tc) - R * Z * \cos(T_4) * \cos(P_4 - Pc)$ |

The calculation part 153 converts the x coordinate and y coordinate of each vertex a, b, c and d calculated from the two-dimensional coordinate system into an image coordinate system. At this time, x1, x2, x3, and x4 correspond to the x coordinate of each vertex a, b, c and d and are directly converted to the image coordinate system, and y1, y2, y3, and y4 correspond to the y coordinate of each vertex a, b, c and d and are divided by sin(Tc) to convert into the image coordinate system. This compensates the vertical Y of the camera screen 200 depending on the tilt angle Tc when the three-dimensional coordinate system is converted to the two dimensional coordinate system.

Figure 5E:
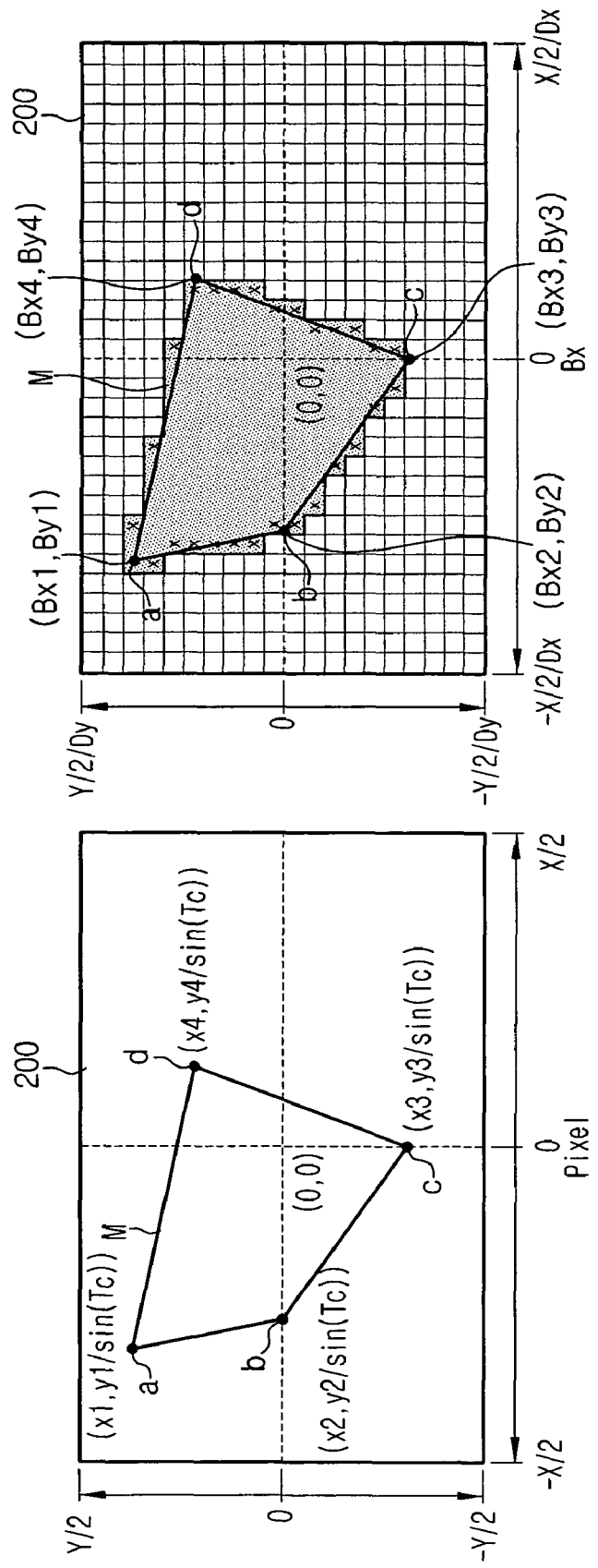

FIG. 5E illustrates a method of calculating the mask area M by blocking on the image coordinate system.

The blocking is a method of decreasing the calculating amount when the area is calculated based on a pixel unit. The size of the camera screen 200 is divided by certain units Dx and Dy to calculate the area. For example, if the size of the camera screen 200 is divided into blocks of 8×8 pixel, Dx=8, and Dy=8. At this time, a block mapping is performed with regard to each vertex a, b, c and d. The x coordinate of the first vertex a is divided by 8 and block-mapped to calculate $Bx_1$, and the y coordinate of the first vertex a is divided by 8 and block-mapped to calculate $By_1$. Likewise, the block mapping is performed with regard to each of the second vertex b, the third vertex c and the fourth vertex d to calculate the coordinate values.

Four linear equations are calculated that form between each vertex a, b, c and d, by using the calculated coordinate values of each vertex a, b, c, d to calculate the mask area M. The method of calculating the equation regarding the first vertex a and the second vertex b is as follows.

$$Bx = \frac{(By - By_1)(Bx_2 - Bx_1)}{By_2 - By_1} + Bx_1 \quad \text{[Equation 5]}$$

Based on the equation 5, the equation between the second vertex b and the third vertex c, the equation between the third vertex c and the fourth vertex d, and the equation between the fourth vertex d and the first vertex a are calculated. The calculation part 153 calculates the start point and the end point of the pixel Bx per each line by using the calculated four equations, and finally calculates the mask area M.

Figure 6:
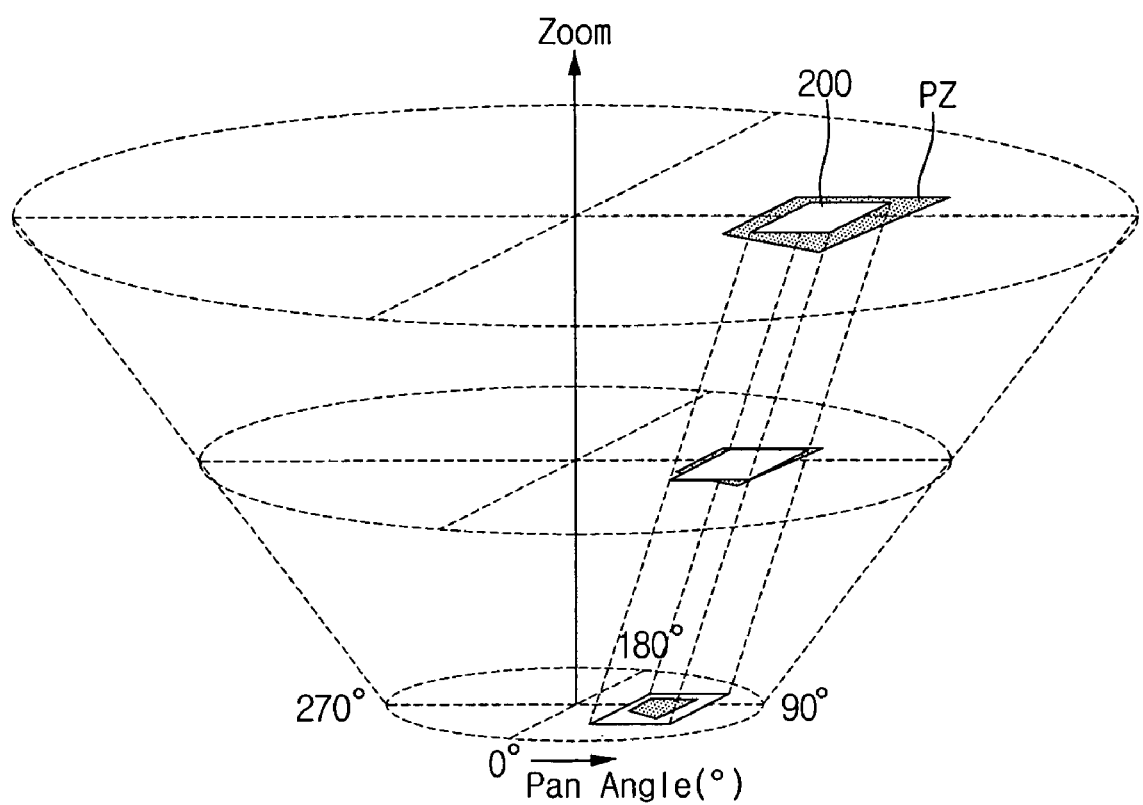
FIG. 6 is a view of a mask area size depending on zoom operation of the observation system according to an exemplary embodiment of the present invention.

FIG. 6 is a view of sizes of mask areas depending on zooming of an observation system according to an exemplary embodiment of the present invention.

Referring to FIG. 6, the size of the camera screen 200 is fixed, and the size of the mask area M is changed in proportion to the degree of the zoom value Z. Specifically, when the zoom value Z is minimum (wide), the size of the mask area M is minimized. When the zoom value Z is maximum (tele), the size of the mask area M is maximized.

Figure 7:
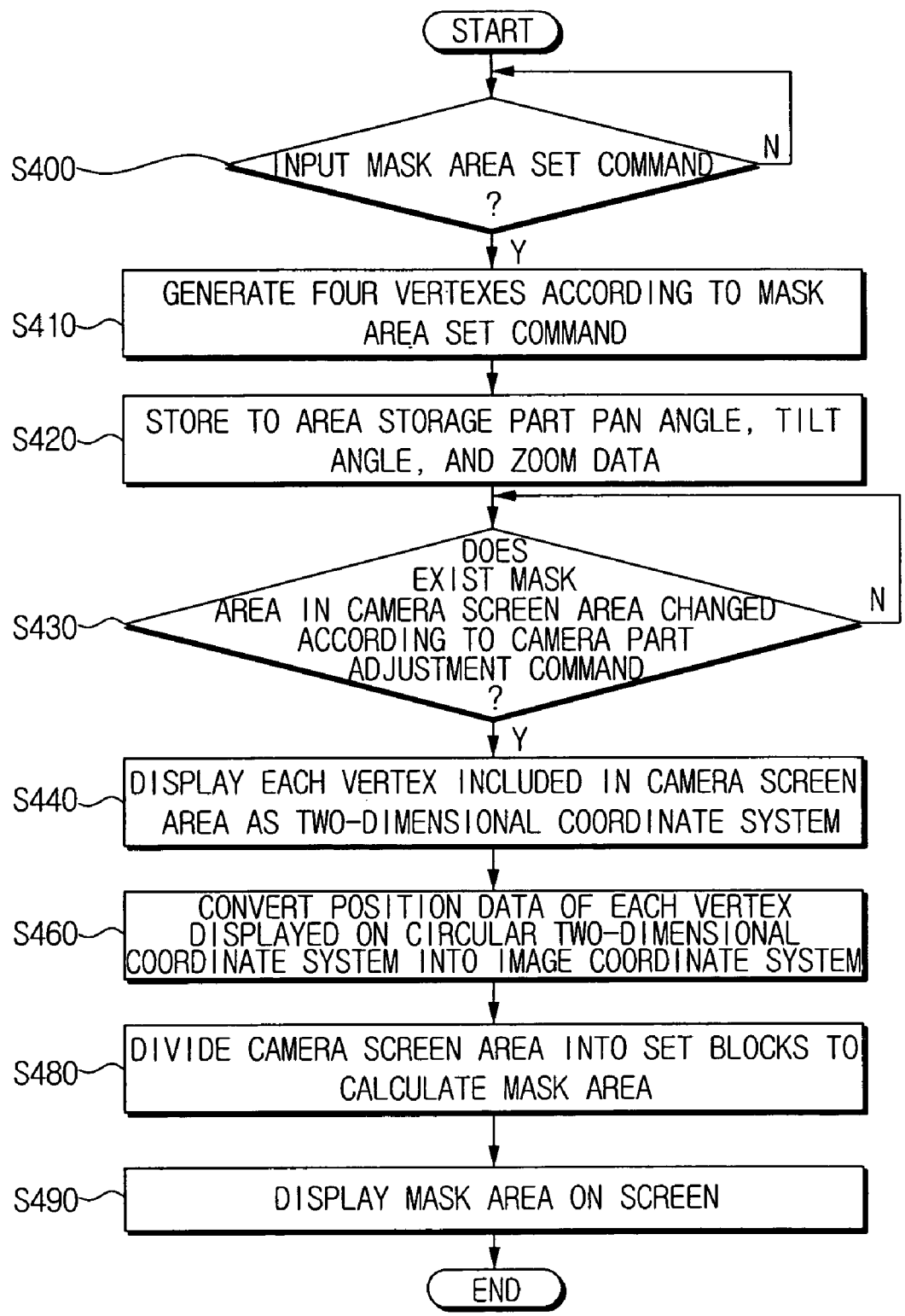
FIG. 7 is a flowchart of the method of displaying the mask area of the observation system according to an exemplary embodiment of the present invention.

FIG. 7 is a flowchart of a method of displaying a mask area of an observation system according to an exemplary embodiment of the present invention.

Referring to FIG. 7, a user inputs the command for setting the mask area M via the operation part 140 (S400).

The control part 130 generates four vertexes that form the mask area M according to the set command of the mask area M. The pan angle P, the tilt angle T, and the zoom value Z are generated corresponding to the four vertexes a, b, c and d (S410).

The pan angle P, the tilt angle T, and the zoom value Z are stored to the area storage part 155, which are generated from the control part 130 and correspond to the four vertexes a, b, c and d. (S420).

When the area set part 150 determines that the mask area M exists on the changed camera screen 200 as a user inputs the adjustment command of the camera part 100, that is, when the privacy zone PZ is photographed (S430), each vertex a, b, c and d forming the mask area M is displayed as the circular two-dimensional coordinate system. More specifically, the pan angle P, the tilt angle T, and the zoom value Z corresponding to each vertex a, b, c and d are projected from the three-dimensional coordinate system to convert each vertex a, b, c and d into position data on the two-dimensional coordinate system (S440).

The position data of each vertex a, b, c and d displayed on the two-dimensional coordinate system is converted into the image coordinate system (S460).

The camera screen 200 is divided into blocks of certain pixels to calculate the mask area M (S480).

Based on the calculated mask area M, the image signal process part 110 masks the privacy zone PZ according to a mosaic scheme to display the mask area on the screen (S490).

According to exemplary embodiments of the present invention as described above, the mask area is calculated based on the two-dimensional coordinate system so that the amount for calculating the mask area is decreased and the mask area may be displayed on the camera screen changed depending on rapid movement of the observation camera. More mask areas may be set on the camera screen, greater mask area than the camera screen may be displayed, and the mask area may be minutely set depending on the size and the form of the privacy zone.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An observation system, comprising:
   a camera part for photographing an observation area;
   an operation part for receiving a user-set command for selecting a privacy zone within the observation area, the privacy zone requiring no observation;
   a control part for outputting a control signal for setting a mask area for masking the privacy zone according to the user-set command;
   an area set part for generating a plurality of vertexes forming the mask area according to the control signal;
   an image signal process part using a mosaic scheme to mask the privacy zone photographed by the camera part according to the mask area formed by the plurality of vertexes set by the area set part; and
   an output part for displaying the mask area masked by the image signal process part,
   wherein the area set part includes an area storage part for storing position data corresponding to the plurality of vertexes, the position data including a rotating angle of the camera part in a horizontal direction, a rotating angle of the camera part in a vertical direction, and a zoom value of the camera part, each of the position data corresponding to one of the plurality of vertexes,
   wherein the area set part includes a calculation part for calculating the mask area corresponding to a position and a size of the privacy zone when the privacy zone is photographed by the camera part, wherein the calculation part models the rotating angle in the horizontal direction, the rotating angle in the vertical direction, and the zoom value of the camera part into the position data corresponding to the plurality of vertexes on a hemispheric three-dimensional coordinate system, and wherein the calculation part converts the rotating angle in the horizontal direction, the rotating angle in the vertical direction, and the zoom value corresponding to the plurality of vertexes modeled on the hemispheric three-dimensional coordinate system into the position data with x and y coordinates on a two-dimensional coordinate system by using the following equations:

x coordinate of each vertex=$R*Z*\cos(T)*\sin(P-Pc)$, and y coordinate of each vertex=$R*Z*\cos(Tc)-R*Z*\cos(T)*\cos(P-Pc)$, in which R is a radius of a circle modeled on the two-dimensional coordinate system when the hemispheric three-dimensional coordinate system is projected to the two-dimensional coordinate system, Pc is the rotating angle in the horizontal direction corresponding to a center of a camera screen photographed by the camera part, Tc is the rotating angle in the vertical direction corresponding to the center of the camera screen photographed from the camera part, P is the rotating angle in the horizontal direction corresponding to the position having the x and y coordinates with respect to the Pc, T is the rotating angle in the vertical direction corresponding to the position having the x and y coordinates with respect to the Tc, and Z is the zoom value used in obtaining each vertex.

2. The system as claimed in claim 1, wherein the calculation part converts the position data corresponding to the plurality of vertexes with x and y coordinates on the two-dimensional coordinate system to the position data on an image coordinate system displayed on the camera screen.

3. The system as claimed in claim 2, wherein the calculation part divides the camera screen into blocks of a certain unit of pixels on the image coordinate system, and converts the position data on the image coordinate system to the position data that is block-wise divided on the image coordinate system.

4. The system as claimed in claim 3, wherein the calculation part calculates the mask area by using a linear equation based on the position data corresponding to the plurality of vertexes on the image coordinate system that is block-wise divided.

5. The system as claimed in claim 1, wherein the area set part further includes a buffer part for temporarily storing an image signal corresponding to the mask area calculated by the calculation part.

6. A method for displaying a mask area of an observation system including a camera part photographing an observation area, comprising the steps of photographing the observation area;

inputting a user-set command for selecting a privacy zone within the observation area, the privacy zone requiring no observation;

outputting a control signal setting the mask area for masking the privacy zone according to the user-set command;

generating a plurality of vertexes forming the mask area according to the control signal; masking the privacy zone photographed by the camera part according to a mosaic scheme based on the mask area formed by the plurality of vertexes; and displaying the mask area wherein the step of generating the plurality of vertexes further comprises storing position data corresponding to the plurality of vertexes, the position data including a rotating angle of the camera part in a horizontal direction, a rotating angle of the camera part in a vertical direction, and a zoom value of the camera part, each corresponding to the plurality of vertexes, wherein the step of generating the plurality of vertexes further comprises calculating the mask area corresponding to a position and a size of the privacy zone when the privacy zone is photographed by the camera part, wherein the step of calculating the mask area models the rotating angle of the camera part in the horizontal direction, the rotating angle of the camera part in the vertical direction and the zoom value of the camera part into the position data corresponding to the plurality of vertexes on a hemispheric three-dimensional coordinate system, and wherein the step of calculating the mask area converts the rotating angle of the camera part in the horizontal direction, the rotating angle of the camera part in the vertical direction and the zoom value corresponding to the plurality of vertexes modeled on the hemispheric three-dimensional coordinate system into the position data with x and y coordinates on a two-dimensional coordinate system by using the following equations:

x coordinate of each vertex=$R*Z*\cos(T)*\sin(P-Pc)$, and y coordinate of each vertex=$R*Z*\cos(Tc)-R*Z*\cos(T)*\cos(P-Pc)$, in which R is a radius of circle modeled on the two-dimensional coordinate system when the hemispheric three-dimensional coordinate system is projected to the two-dimensional coordinate system, Pc is the rotating angle of the camera part in the horizontal direction corresponding to a center of a camera screen photographed by the camera part, Tc is the rotating angle of the camera part in the vertical direction corresponding to the center of the camera screen photographed from the camera part, P is the rotating angle in the horizontal direction corresponding to the position having the x and y coordinates with respect to the Pc, T is the rotating angle in the vertical direction corresponding to the position having the x and y coordinates with respect to the Tc, and Z is the zoom value used in obtaining each vertex.

7. The method as claimed in claim 6, wherein the step of calculating the mask area converts the position data corresponding to the plurality of vertexes with x and y coordinates on the two-dimensional coordinate system into the position data on an image coordinate system displayed on the camera screen.

8. The method as claimed in claim 7, wherein the step of calculating the mask area divides the camera screen into blocks of a certain unit of pixels on the image coordinate system and converts the position data on the image coordinate system into the position data that is block-wise divided on the image coordinate system.

9. The method as claimed in claim 8, wherein the step of calculating the mask area calculates the mask area by using a linear equation based on the position data corresponding to the plurality of vertexes on the image coordinate system that is block-wise divided.

10. The method as claimed in claim 9, wherein the step of generating the plurality of vertexes further comprises temporarily storing an image signal corresponding to the mask area.

* * * * *